United States Patent
Samejima et al.

(10) Patent No.: US 6,675,567 B2
(45) Date of Patent: Jan. 13, 2004

(54) LAWN TRACTOR WITH JACK-UP MECHANISM

(75) Inventors: Kazuo Samejima, Kaizuka (JP); Yoshikazu Togoshi, Osaka (JP); Yoshiyuki Esaki, Sakai (JP); Hironori Tsuchihashi, Wakayama (JP); Yoshihiro Kawahara, Sakai (JP); Osami Fujiwara, Kishiwada (JP); Teruo Shimamura, Nishinomiya (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/319,331

(22) Filed: Dec. 13, 2002

(65) Prior Publication Data

US 2003/0079454 A1 May 1, 2003

Related U.S. Application Data

(62) Division of application No. 09/516,994, filed on Mar. 1, 2000, now Pat. No. 6,516,597.

(30) Foreign Application Priority Data

Jun. 8, 1999 (JP) .......................................... 11-160944

(51) Int. Cl.$^7$ .............................................. A01D 34/03
(52) U.S. Cl. .......................................................... 56/16.7
(58) Field of Search ................................ 56/16.7, 17.2, 56/15.8, 17.1, 15.7; 16/35 R; 280/48.13, 287; 180/208, 216

(56) References Cited

U.S. PATENT DOCUMENTS

| | | | | |
|---|---|---|---|---|
| 3,442,526 A | * | 5/1969 | Olson | 280/43.13 |
| 3,512,344 A | * | 5/1970 | Kortum | 56/320.1 |
| 3,654,749 A | * | 4/1972 | Ostergren et al. | 56/15.8 |
| 3,712,404 A | * | 1/1973 | Walquist | 180/212 |
| 4,349,937 A | * | 9/1982 | Fontana | 16/35 R |
| 4,442,660 A | * | 4/1984 | Kuhn | 56/15.9 |
| 4,744,582 A | * | 5/1988 | Wykhuis et al. | 172/244 |
| 4,779,406 A | * | 10/1988 | Schroeder | 56/15.9 |
| 4,829,754 A | * | 5/1989 | Shimamura et al. | 56/15.9 |
| 5,079,907 A | * | 1/1992 | Sameshima et al. | 56/15.9 |
| 5,079,926 A | * | 1/1992 | Nicol | 56/12.7 |
| 5,355,665 A | * | 10/1994 | Peter | 56/15.8 |
| 5,425,221 A | * | 6/1995 | Pronovost et al. | 53/567 |
| 5,475,971 A | * | 12/1995 | Good et al. | 56/14.9 |
| 5,695,021 A | * | 12/1997 | Schaffner et al. | 180/208 |
| 5,873,224 A | * | 2/1999 | Murakawa et al. | 56/11.4 |
| 5,887,671 A | * | 3/1999 | Yuki et al. | 180/68.1 |
| 5,927,055 A | * | 7/1999 | Ferree et al. | 56/15.9 |
| 6,516,597 B1 | * | 2/2003 | Samejima et al. | 56/16.7 |
| 2002/0157369 A1 | | 10/2002 | Fontanes, II et al. | |

* cited by examiner

*Primary Examiner*—Árpád Fábián Kovács
(74) *Attorney, Agent, or Firm*—Webb Ziesenheim Logsdon Orkin & Hanson, P.C.

(57) ABSTRACT

A mid-mount type lawn tractor having idle wheels disposed at one end in a fore and aft direction of a vehicle body, drive wheels disposed at the other end in the fore and aft direction of the vehicle body, a mower unit connected to the vehicle body between the idle wheels and drive wheels. The lawn tractor includes a wheel support frame supporting the idle wheels and pivotably connected to the vehicle body. A pivotal movement of the wheel support frame relative to the vehicle body displaces the idle wheels relative to the vehicle body, to produce a running posture or a jack-up posture lifting at least part of the vehicle body. The pivotal movement of the wheel support frame is caused by a jack device.

14 Claims, 10 Drawing Sheets

LAWN TRACTOR WITH JACK-UP MECHANISM

CROSS REFERENCE TO RELATED APPLICATIONS

This application is a divisional of U.S. patent application Ser. No. 09/516,994, filed Mar. 1, 2000, now U.S. Pat. No. 6,516,597, issued Feb. 11, 2003, which claims the benefit of Japanese Application No. 11-160944, filed Jun. 8, 1999.

BACKGROUND OF THE INVENTION

1. Field of the Invention

This invention relates to a mid-mount type lawn tractor having a vehicle body extending fore and aft in a traveling direction, a first wheel unit disposed adjacent one end in the fore and aft direction of the vehicle body, a second wheel unit disposed adjacent the other end in the fore and aft direction of the vehicle body, and a mower unit connected to the vehicle body between the first and second wheel units.

2. Description of Related Art

When grass twines around in the mower unit or when cutting blades become worn, the interior of the mower unit must be cleaned or the cutting blades ground or changed. Such an operation carried out while the mower unit remains connected to the vehicle body would encounter difficulties of access, i.e. difficulties in inserting hands and tools into the mower unit. Conventionally, therefore, a maintenance operation is performed after detaching the mower unit from the vehicle body. The interior of the mower unit has to be cleaned or components thereof changed frequently. It is a heavy burden on the operator to have to detach the mower unit from the vehicle body and connect it to the vehicle body again each time such an operation is carried out.

SUMMARY OF THE INVENTION

An object of this invention is to provide a lawn tractor with a relatively simple construction for facilitating an operation to maintain and inspect the interior of a mower unit without detaching the mower unit from a vehicle body.

The above object is fulfilled, according to this invention, by a mid-mount type lawn tractor comprising a vehicle body extending fore and aft with respect to a traveling direction, a first wheel unit disposed adjacent one end in a fore and aft direction of the vehicle body, a second wheel unit disposed adjacent the other end in the fore and aft direction of the vehicle body, a mower unit connected to the vehicle body between the first and second wheel units, a wheel support frame supporting the first wheel unit and pivotably connected to the vehicle body, wherein the first wheel unit is displaceable relative to the vehicle body with a pivotal movement of the wheel support frame relative to the vehicle body, to produce one of a device for swinging the wheel support frame to produce the running posture and the jack-up posture.

With this construction, when the jack device is operated to pivot the wheel support frame relative to the vehicle body, the wheel support frame produces the jack-up posture lifting one end of the vehicle body about the wheel axis of the second wheel unit, with the first wheel unit acting as a reaction point on the ground for lifting the vehicle body. As a result of the lift of the vehicle body, one of the mower unit in the fore and aft direction of the vehicle body is raised to expose the interior of the mower unit upward.

When an operation is carried out by accessing the interior of the mower unit, such as for cleaning the mower unit or changing cutting blades, the interior of the mower unit may be exposed upward toward the first wheel unit while the mower unit remains connected to the vehicle body. Thus, the operator may perform a maintenance operation efficiently by inserting the hands and tools therein with ease. Moreover, by using the wheel support frame as a lever for jack-up, the jack device may have a relatively small and simple construction only for turning the wheel support frame.

It is convenient where the first wheel unit is an idle wheel unit, and the second wheel unit is a drive wheel unit. This is because, where a construction where employed for jacking up the drive wheel unit, the transmission line to the drive wheel unit must be remodeled which would complicate the jack-up mechanism.

Taking balance in running and the like into account, the idle wheel unit preferably includes a pair of right and left idle wheels supported by right and left ends of the wheel support frame.

In a preferred embodiment of this invention, the wheel support frame is supported by the vehicle body to be pivotable about an axis extending in the fore and aft direction and disposed between a support point supporting one of the idle wheels and a support point supporting the other idle wheel, a distance from one of the support points to the axis being greater than a distance from the other support point to the axis. With this construction, the vehicle body may be lifted about a reaction point on the ground provided by the one of the idle wheels supported at the opposite ends of the wheel support frame, whose support point is at the greater distance to the axis of pivotal movement of the wheel support frame. Thus, the vehicle body may be jacked up high for the total length and pivoting stroke of the wheel support frame. As a result, one end of the vehicle body is lifted as high as possible, to expose the interior of the mower unit to a great extent to facilitate an operation for inspecting the interior or changing components.

In another embodiment of this invention, the idle wheels are caster type wheels each supported by the wheel support frame to be swivelable about a caster axis, and a lock device is provided for releasably locking the caster type wheel to a direction where a wheel axis of the caster type wheel is farther away than the caster axis from the axis about which the wheel support frame is pivotable relative to the vehicle body. With this construction, when lifting the vehicle body by the wheel support frame, the lock device is operated to keep at least one of the caster type wheels to a predetermined orientation. This maximizes the distance from the axis of pivotal movement of the wheel support frame to the reaction point on the ground. The vehicle body is lifted high for the total length and pivoting stroke of the wheel support frame. That is, the characteristics of the caster type wheel are used to lift the vehicle body as high as possible, to expose the interior of the mower unit to a great extent to facilitate an operation for inspecting the interior or changing components. This is achieved by a relatively simple construction additionally requiring the lock device only.

In a further embodiment of this invention, the mower unit is connected to the vehicle body through a pair of front and rear pivotal links vertically pivotably supported by the vehicle body, and a link lock device is provided for locking against downward pivotal movement one of the front and rear pivotal links close to the wheel support frame. With this construction, the vehicle body is jacked up with the link lock device operated to a locking state, and the pivotal link remote from the idle wheels disconnected from the mower unit. Alternatively, after the vehicle body is jacked up, the link lock device operated to the locking state, and the pivotal link remote from the idle wheels is disconnected from the mower unit. Then, with one end of the vehicle body in the jack-up posture, the mower unit is suspended from the vehicle body through only the one of the front and rear pivotal links closer to the idle wheels. Compared with the case of the mower unit remaining suspended through both the front and rear pivotal links, the mower unit may be suspended to form a large angle with the ground, thereby exposing the interior by an increased degree upward. Thus, the interior of the mower unit lifted by the jack-up of the vehicle body has a large upturned angle for the height to which the vehicle body is lifted. Without lifting the vehicle body to a great height, the interior of the mower unit may easily be turned by an increased degree upward for allowing an operation to be carried out for the interior easily and efficiently.

In a further embodiment of this invention, the jack device is connected to the wheel support frame or the vehicle body through a play-accommodating device for allowing the wheel support frame to roll about the axis relative to the vehicle body. With the lawn tractor which employs this construction, when the wheels ride on a ridge or sink in a recess, the wheel support frame rolls about the axis relative to the vehicle body to vary the height of the right and left wheels relative to the vehicle body. Consequently, the transverse posture of the vehicle body is maintained horizontal or near horizontal, whereby no or little variation occurs in the height above the ground of the left side and right side of the mower unit. Even where the ground is rugged, the rolling of the wheel support frame maintains the left side and right side of the mower unit at a substantially constant height above the ground. An operation is carried out with a substantially uniform right and left cutting height to produce an excellent result.

Moreover, the above feature is provided by a simple construction additionally requiring the play-accommodating device only, which is achieved by utilizing, for the rolling mechanism, the wheel support frame pivotable relative to the vehicle body to lift the latter. Such a construction has an advantage in terms of cost also.

In a further embodiment of this invention, the jack device is a manually operable screw type jack device. A simplified jack-up structure is realized by employing the screw type jack device.

The lawn tractor according to this invention may have an engine disposed rearwardly of a wheel axis of the second wheel unit. Then, the weight of the engine assists in lifting the wheel support frame. Other features and advantages of this invention will be apparent from the following description of the embodiments to be taken with reference to the drawings.

DESCRIPTION OF THE PREFERRED EMBODIMENTS

Figure 1:
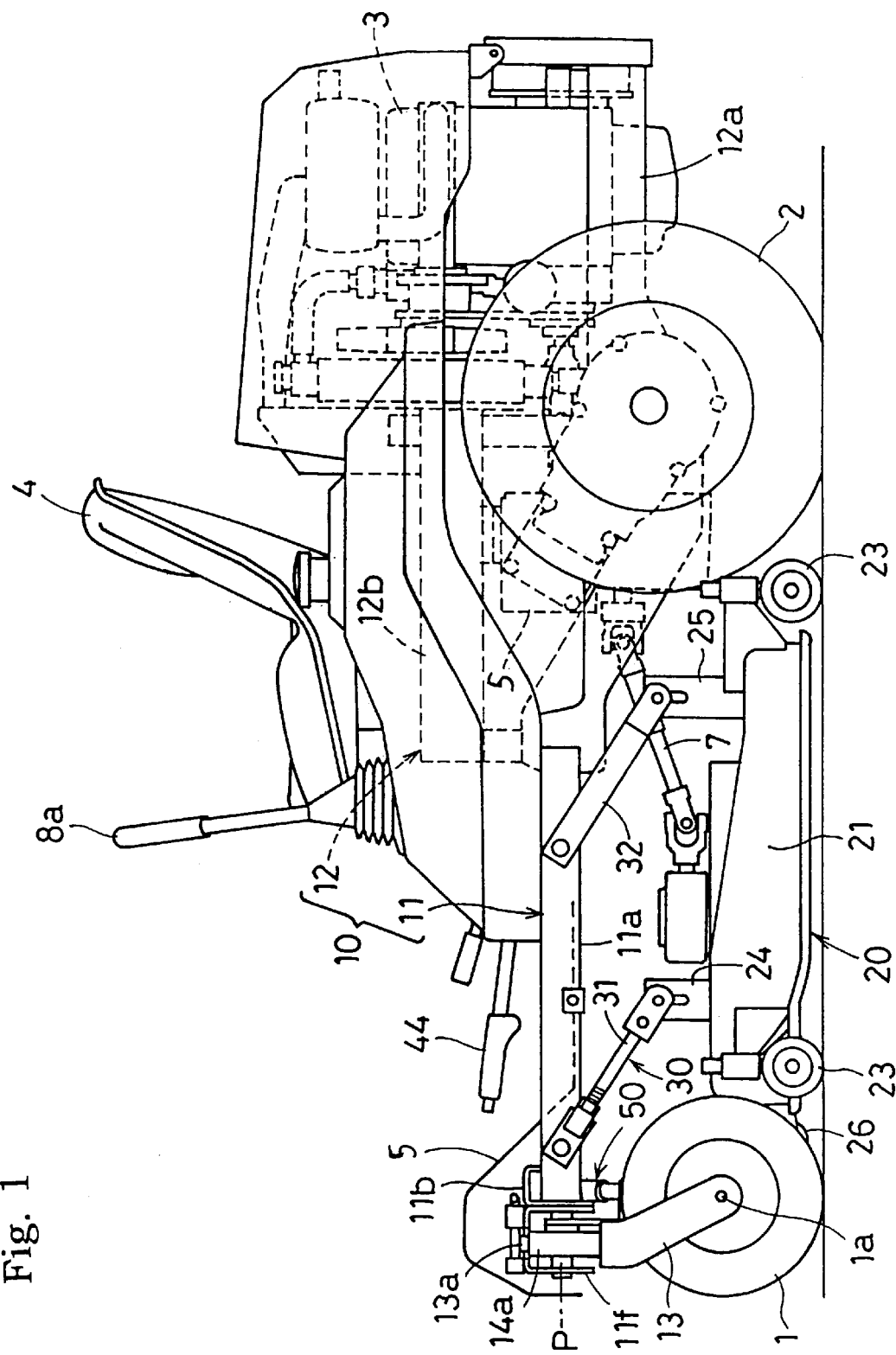
FIG. 1 is a side elevation of a lawn tractor.
Figure 2:
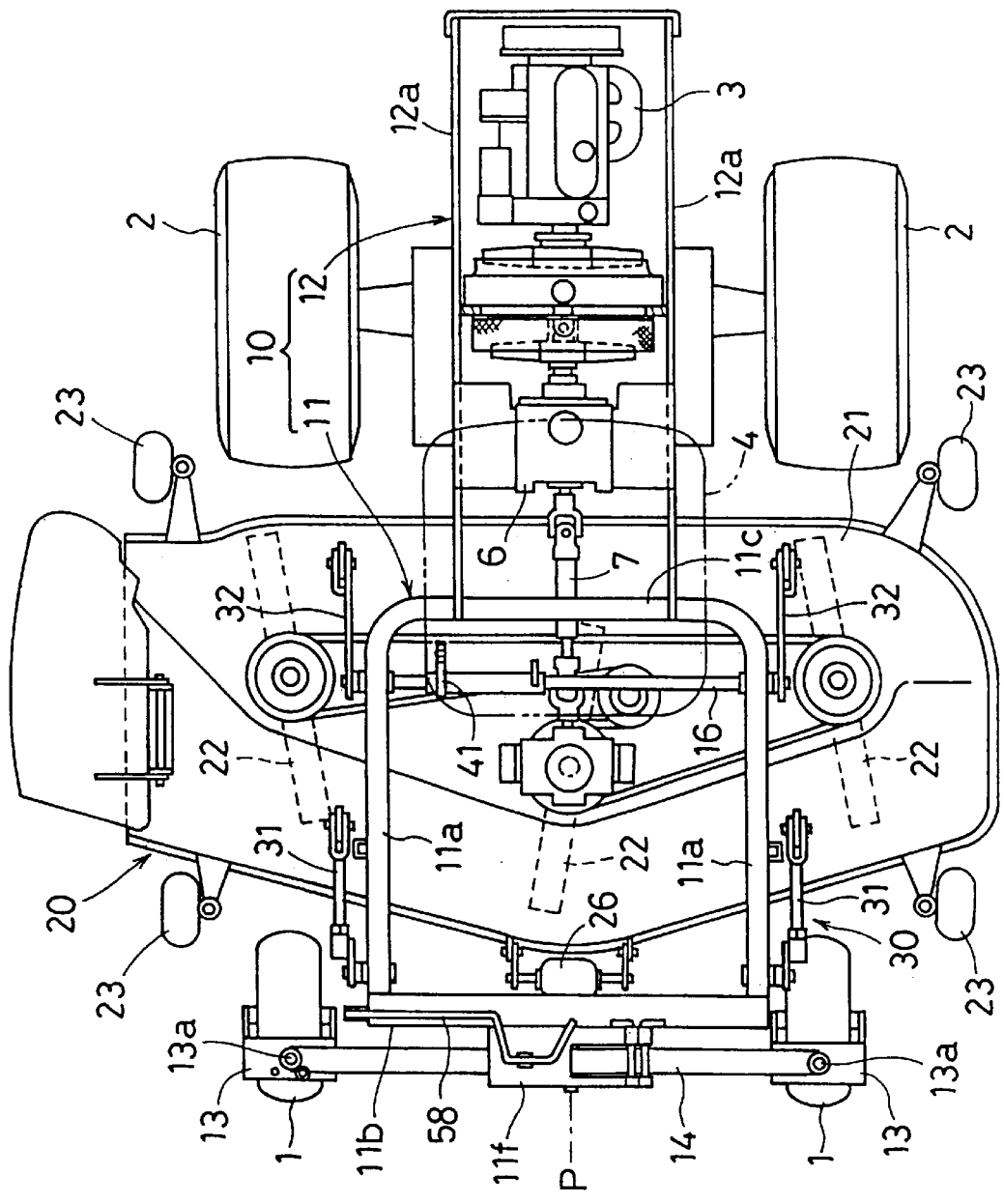
FIG. 2 is a plan view of a vehicle body and a connecting mechanism.

As shown in FIGS. 1 and 2, a mid-mount lawn tractor includes a vehicle body 10 having a pair of right and left front wheels 1 acting as a first wheel unit freely rotatably attached to a forward end thereof, and a pair of right and left rear wheels 2 acting as a second wheel unit drivably attached to a rear portion thereof. A motor section mounted on the rear portion of the vehicle body 10 has an engine 3 disposed slightly rearwardly of an axis of rear wheels 2. A driving platform has a driver's seat 4 disposed on the vehicle body 10 forwardly of the motor section and slightly forwardly of the axis of rear wheels 2, and a floor plate 5 supported on a forward portion of the vehicle body 10. A mower unit 20 having a mower deck 21 is disposed between the front and rear wheels 1 and 2, and vertically movably connected to the vehicle body 10 through a link type connection mechanism 30. The mower unit 20 is driven by a transmission 6 disposed between the right and left rear wheels 2. Rotating power is transmitted to the mower unit 20 through a rotary shaft 7.

The mower unit 20 includes, besides the mower deck 21, a plurality of rotary cutting blades 22 arranged in the mower deck 21 transversely of the vehicle body, and gauge wheels 23 affixed to front and rear positions of the mower deck 21. The link type connection mechanism 30 is operable to lower the mower unit 20 relative to the vehicle body 10, to an operative position. The tractor travels with the mower unit 20 placed in the operative position. Then, the rotary cutting blades 22 are rotated about vertical axes by drive transmitted from the engine 3. Grass is cut at a cutting height determined by a height at which the gauge wheels 23 are attached to the mower deck 21 or a height at which the mower unit 20 is suspended from the vehicle body 10.

As best shown in FIG. 2, the vehicle body 10 includes a forward body frame 11 and a rearward body frame 12. The forward body frame 11 includes a pair of right and left frame portions 11a extending longitudinally of the vehicle body 10, a front connecting frame portion 11b extending between front ends of the right and left frame portions 11a, and a rear connecting frame portion 11c extending between rear ends of the right and left frame portions 11a. The rearward body frame 12 includes a pair of right and left main rear frame portions 12a extending longitudinally of the vehicle body 10 and connected at forward ends thereof to the rear connecting frame portion 11c of forward body frame 11, and a seat support frame portion 12b extending between forward regions of the right and left main rear frame portions 12a. The right and left frame portions 11a of forward body frame 11 are formed of opposite end regions of a channel sheet metal material (profile member) bent to have the opposite end regions extend longitudinally of the vehicle body. The rear connecting frame portion 11c of forward body frame 11 is formed of an intermediate portion of the channel sheet metal material. The right and left main rear frame portions 12a of rearward body frame 12 are formed of a flat sheet metal material, each having a direction of width corresponding to the vertical direction of the vehicle body 10, and a direction of thickness corresponding to the transverse direction of the vehicle body 10. The seat support frame portion 12b is formed of a combination of the channel sheet metal material and flat sheet metal material.

A front wheel support 13 for freely rotatably supporting the left front wheel 1 is connected to one end of a front wheel support frame 14. A front wheel support 13 for freely rotatably supporting the right front wheel 1 is connected to the other end of the front wheel support frame 14. Thus, the front wheel support frame 14 freely rotatably supports the left front wheel 1 at one end thereof, and the right front wheel 1 at the other end. The front wheel support frame 14 is connected at an intermediate position thereof to the front connecting frame portion 11b of forward body frame 11. The front wheel support 13 of left front wheel 1 and the front wheel support 13 of right front wheel 1 are both connected to bosses 14a of front wheel support frame 14 to be pivotable about caster axes 13a horizontally displaced from an axis 1a of front wheels 1. As a result, the right and left front wheels 1 act as caster wheels supported by the front end of vehicle body 10 through the front wheel supports 13 and front wheel support frame 14, to have directions of attachment to the front wheel support frame 14 freely variable about the caster axes 13a.

The transmission 6 includes a pair of stepless change speed devices for transmitting a torque output of engine 3 to the left rear wheel 2 and right rear wheel 2, respectively. The stepless change speed device for driving the left rear wheel 2 and the stepless change speed device for driving the right rear wheel 2 are both in the form of hydrostatic stepless transmissions having hydraulic pumps driven by the engine 3, and hydraulic motors driven by pressure oil from the hydraulic pumps to output rotating power to the rear wheels 2. By changing swash plate angles of the hydraulic pumps, the rear wheels 2 may be driven forward or backward, or torque transmission may be broken to stop the rear wheels 2. Whether driving forward or backward, the torque transmission may be put to stepless change speed. That is, the rear wheels 2 may be driven forward or backward at steplessly changed speeds.

Figure 3:
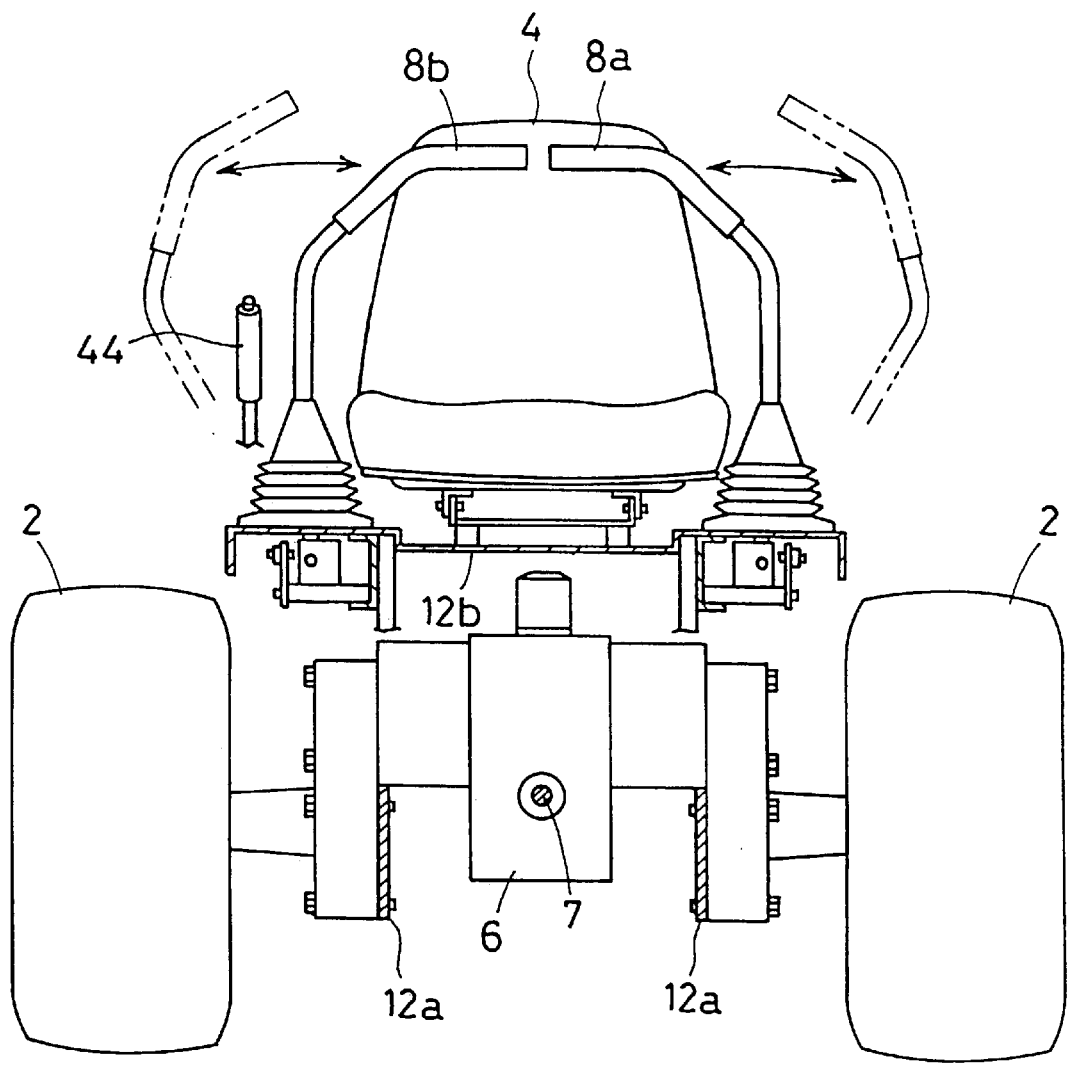
FIG. 3 is a front view of a driving platform.

As best shown in FIG. 3, the driving platform has a left drive lever 8a interlocked to a control section of the stepless change speed device for driving the left rear wheel 2 and a right drive lever 8b interlocked to a control section of the stepless change speed device for driving the right rear wheel 2. These levers 8a and 8b are arranged at a left side and a right side of a forward end of the driver's seat 4.

Specifically, the left drive lever 8a is pivotable longitudinally of the vehicle body to operate the stepless change speed device to drive the left rear wheel 2 forward or backward in varied speeds or stop the left rear wheel 2. The right drive lever 8b is pivotable longitudinally of the vehicle body to operate the stepless change speed device to drive the right rear wheel 2 forward or backward in varied speeds or stop the right rear wheel 2. When the right and left rear wheel 2 are driven at an equal speed forward or backward by operating the left drive lever 8a and right drive lever 8b as noted above, the right and left front wheels 1 are turned to a position for running straight forward or straight by contact with the ground and propulsion of the rear wheels 2, whereby the tractor may travel at variable speed forward or backward. When the right and left rear wheels 2 are driven at different speeds forward or backward, or when one of the rear wheels 2 is driven forward and the other backward, the right and left front wheels 1 are turned about the caster axes 13a to a position for running sideways by contact with the ground and propulsion of the rear wheels 2. Then, the tractor makes a turn in a direction determined by a difference in speed or in driving direction between the right and left rear wheels 2, and with a turning radius determined by the difference in speed or in driving direction.

As shown in two-dot chain Lines in FIG. 3, the right and left drive lever 8a and 8b may be retracted laterally outwardly from the forward end of driver's seat 4 to open up a space forwardly of the driver's seat 4 when the driver takes a seated position or leaves the seat 4.

As best shown in FIG. 2, the link type connection mechanism 30 includes a pair of right and left front pivotal links 31 arranged outwardly of the forward ends of forward body frame 11 of vehicle body 10, and a pair of right and left rear pivotal links 32 arranged outwardly of the rear ends of forward body frame 11.

Figure 5:
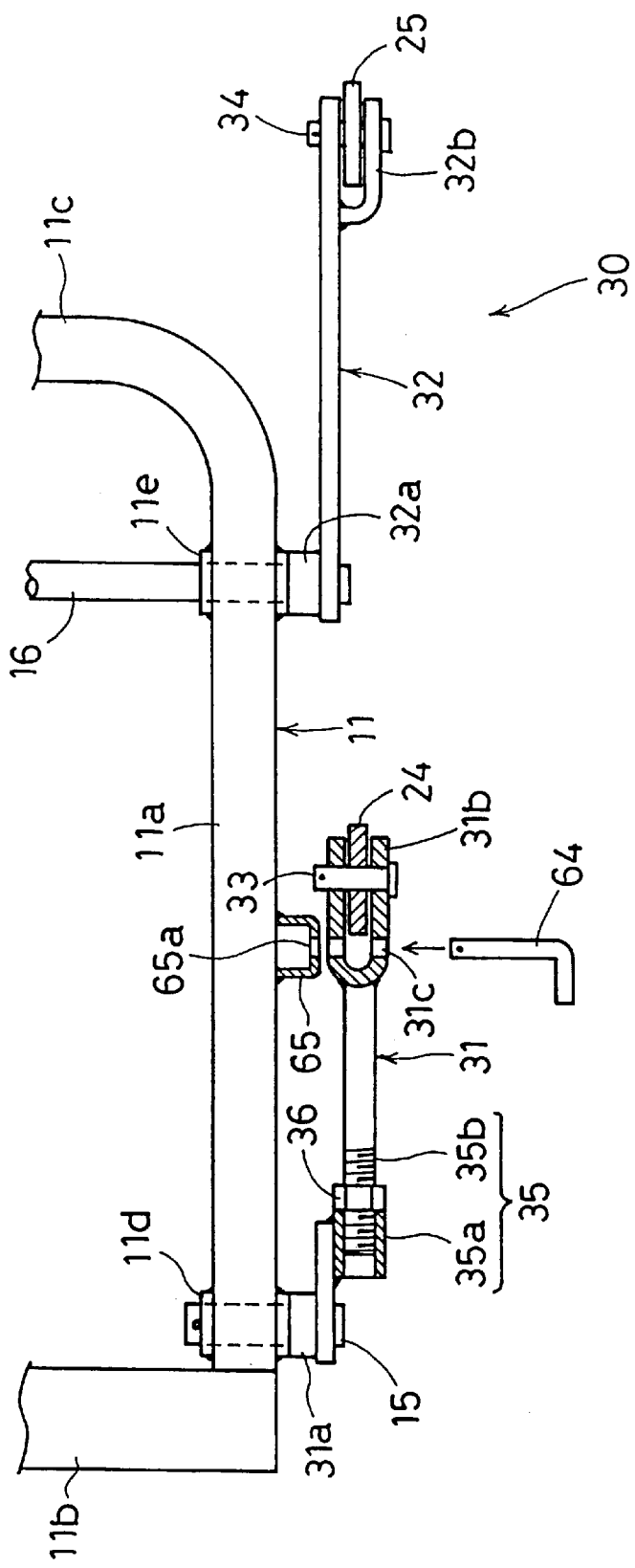
FIG. 5 is a plan view of a left portion of the connecting mechanism.

Specifically, as shown in FIGS. 1, 2 and 5, the left front pivotal link 31 has a boss 31a at a proximal end thereof pivotally connected, by a connecting pin 15 extending transversely of the vehicle body, to a boss 11d at the forward end of the left frame portion 11a of forward body frame 11. The left front pivotal link 31 has a coupling 31b at a free end thereof pivotally connected, by a front connecting pin 33 extending transversely of the vehicle body, to a left one of a pair of right and left front connecting brackets 24 erected in forward end positions on the upper surface of the mower deck 21 of mower unit 20. The right front pivotal link 31 has a boss 31a at a proximal end thereof pivotally connected, by a connecting pin 15 extending transversely of the vehicle body, to a boss 11d at the forward end of the right frame portion 11a of forward body frame 11. The right front pivotal link 31 has a coupling 31b at a free end thereof pivotally connected, by a front connecting pin 33 extending transversely of the vehicle body, to the right one of the pair of right and right front connecting brackets 24 on the mower unit 20. The left rear pivotal link 32 has a boss 32a at a proximal end thereof connected, to be rotatable together, to the left end of a rotatable support shaft 16 extending transversely of the vehicle body between a boss 11e at the rear end of the left frame portion 11a of forward body frame 11 and a boss 11e at the rear end of the right frame portion 11a. The left rear pivotal link 32 has a coupling 32b at a free end thereof pivotally connected, by a rear connecting pin 34 extending transversely of the vehicle body, to a left one of a pair of right and left rear connecting brackets 25 erected in rearward end positions on the upper surface of the mower deck 21 of mower unit 20. The right rear pivotal link 32 has a boss 32a at a proximal end thereof connected to the right end of the rotatable support shaft 16 to be rotatable together. The right rear pivotal link 32 has a coupling 32b at a free end thereof pivotally connected, by a rear connecting pin 34 extending transversely of the vehicle body, the right one of the pair of right and left rear connecting brackets 25 on the mower unit 20.

Thus, the right and left front pivotal links 31 of link type connection mechanism 30 are supported, respectively, by the forward end of right frame portion 11a of vehicle body 10 and the forward end of left frame portion 11a to be vertically pivotable about the separate connecting pins 15. The front pivotal links 31 vertically movably connect the forward end of the mower deck 21 of mower unit 20 to the forward body frame 11. The right and left rear pivotal links 32 are vertically pivotably supported by the rear ends of the right and left frame portions 11a of vehicle body 10 through the rotatable support shaft 16. The rear pivotal links 32 vertically movably connect the rear mower deck 21 of mower unit 20 to the forward body frame 11.

Figure 4:
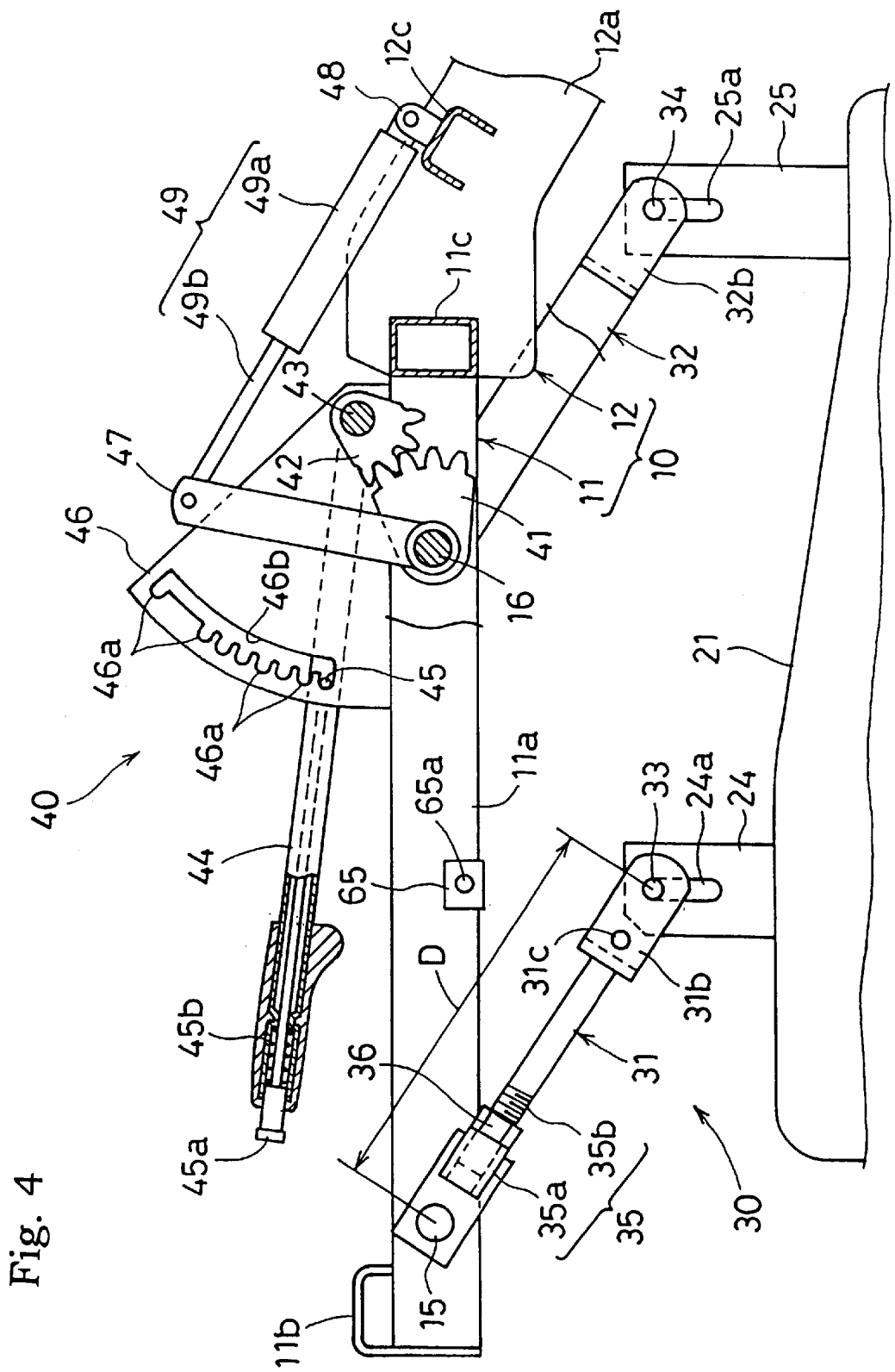
FIG. 4 is a side view of lift control mechanism and the connecting mechanism.

As shown in FIG. 4, a lift control mechanism 40 is provided for raising and lowering the mower unit 20 relative to the vehicle body 10. The lift control mechanism 40 includes a sector-shaped support shaft gear 41 connected, to be rotatable together, to the rotatable support shaft 16 in a position inwardly of the right frame portion 11a, a lever gear 42 meshed with the support shaft gear 41, a support shaft 43 supporting the lever gear 42 mounted on one end thereof to be rotatable together, and a lift control lever 44 disposed in a rightward position on the driving platform and having a proximal end connected to the other end of support shaft 43 to be rotatable together. The lift control mechanism 40 has a lock mechanism for locking the control lever 44 to a selected control position. The lock mechanism includes a lock pin 45 supported by the control lever 44 to be sliceable longitudinally of the latter, and lock member 46 supported by the frame portion 11a and defining a plurality of cutouts 46a for receiving the lock pin 45.

A control arm 47 is connected at a proximal end thereof to an intermediate position longitudinally of the rotatable support shaft 16 to be rotatable together. A gas spring 49 extends between a free end of control arm 47 and a spring bearing 48 supported by the connecting frame 12c interconnecting the right and left main rear frame portion 12a of rearward body frame 12. This gas spring 49 includes a cylinder tube 49a having one end thereof pivotally connected to the spring bearing 48, and a cylinder rod 49b having one end thereof slidably fitted in the cylinder tube 49a, and the other end pivotally connected to the control arm 47. The cylinder tube 49a is filled with a gas. The gas biases the cylinder rod 49b in a direction to project from the cylinder tube 49a. This biasing force rotates the support shaft 16 whereby the right and left pivotal links 32 urge the mower unit 20 to move upward relative to the vehicle body 10. When lowering the mower unit 20 relative to the vehicle body 10, the cylinder rod 49b of gas spring 49 is operated to slide into the cylinder tube 49a. As a result, the gas spring 49 enables the lowering operation of the mower unit 20.

That is, when raising or lowering the mower unit 20 relative to the vehicle body 10, the operator presses an unlock button 45a projecting from a head of control lever 44. This moves the lock pin 45 out of one of the cutouts 46a into a slot 46b formed in the lock member 46, thereby placing the lock mechanism in an unlock state. While unlocking the lock mechanism in this way, the operator rocks the control lever 44 about the axis of support shaft 43 relative to the lock member 46 acting also as a member that rotatably supports the support shaft 43. This lever operating force causes the lever gear 42 to rotate about the axis of support shaft 43, which rotates the support shaft gear 41 and support shaft 16. Consequently, the right and left rear pivotal links 32 pivot in a raising or lowering direction relative to the body frame portions 11a. Since the right and left front pivotal links 31 are interlocked to the rear pivotal links 32 through the mower deck 21, the front pivotal links 31 pivot in the same direction as the rear pivotal links 32. Thus, the mower unit 20 is moved upward or downward relative to the vehicle body 10. When raising the mower unit 20, the raising operation is assisted by the biasing force of gas spring 49, so that the operator may apply a relatively small force to the control lever 44. When the mower unit 20 reaches a selected position, the operator releases the unlock button 45a to allow the lock pin 45 to enter one of the cutouts 46a of lock member 46 under the biasing force of a lock spring 45b mounted in the control lever 44. Then, the lock mechanism assumes a locking state to lock the control lever 44 against movement to a lowering position due to the weight of mower unit 20. This lever locking function allows the mower unit 20 to be locked to a selected height.

As shown in FIGS. 4 and 5, a length adjusting unit 35 is provided adjacent the proximal end of each of the right and left front pivotal links 31. The length adjusting unit 35 includes a threaded tube 35a welded to a vehicle-side portion of front pivotal link 31 having the boss 31a, and a threaded shank 35b formed on a mower-side portion of front pivotal link 31 having the coupling 31b. The length of front pivotal link 31 is adjustable by turning the threaded tube 35a and threaded shank 35b relative to each other to vary a length of engagement therebetween. This varies a distance D between the axis of connecting pin 15 acting as a connecting point of front pivotal link 31 to the body frame portion 11a and the axis of front connecting pin 33 acting as a connecting point to the mower deck 21 of mower unit 20. A lock nut 36 is mounted on threaded shank 35b for locking the front pivotal link 31 to an adjusted length to be proof against variations due to vibration or the like.

Thus, by operating the length adjusting units 35 of right and left front pivotal links 31 to vary the respective distances D between the connecting points, the mower deck 21 pivots vertically relative to the vehicle body about connecting points to the rear pivotal links 32. In this way, the mower unit 20 may be adjusted for an appropriate posture of connection to the vehicle body.

As shown in FIG. 4, connecting slots 24a and 25a are formed in the right and left front connecting brackets 24 and right and left rear connecting brackets 25 on the mower deck 21 of mower unit 20. The connecting pins 33 and 34 slidably received in the connecting slots 24a and 25a. The mower unit 20 is connected to the front pivotal links 31 and rear pivotal links 32 while being allowed to move vertically relative thereto within a range determined by the length of slots 24a and 25a.

The front wheels 1 or rear wheels 2 may fall into recesses on the ground, or the gauge wheels 23 of mower unit 20 or an obstacle overriding roller 26 attached to the forward end of mower deck 21 may ride onto ridges on the ground. Such an incidence results in an upwardly pushing force acting on the mower unit 20. However, the connecting slots 24a and 25a in the front connecting brackets 24 and rear connecting brackets 25 allow the mower unit 20 to move upward relative to the front pivotal links 31 and rear pivotal links 32. Thus, a grass cutting operation may be carried out while easing shocks applied from the ground to the mower unit 20.

As shown in FIGS. 6 through 9, the front wheel support frame 14 is pivotally connected in an intermediate position thereof, by a connecting pin 17, to a frame support 11f formed of sheet metal and welded to a middle portion of the front connecting frame portion 11b of forward body frame 11. The front wheel support frame 14 is pivotable relative to the vehicle body 10 about the axis of connecting pin 17 providing a pivotal axis P disposed in an intermediate position transversely of the vehicle body 10. Through this pivotal movement, the front wheel support frame 14 is switchable between a running posture shown in FIG. 7A and a jack-up posture shown in FIG. 7B.

When the front wheel support frame 14 is in the jack-up posture shown in FIG. 7B, the left front wheel 1 is raised relative to the vehicle body 10, and the right front wheel 1 lowered relative to the vehicle body 10. The front wheel support frame 14 is raised forwardly of the vehicle body 10 with the right front wheel 1 acting as a ground reaction point. The forward end of vehicle body 10 is raised about the axis of the rear wheels 2. The vehicle body 10 is supported in this inclined jack-up posture relative to the ground. When the front wheel support frame 14 is in the running posture shown in FIG. 7A, the left front wheel 1 is lowered relative to the vehicle body 10, and the right front wheel 1 raised relative to the vehicle body 10, compared with the jack-up posture.

The front wheel support frame 14 places the vehicle body 10 in the running posture relative to the ground.

The pivotal axis P of front wheel support frame 14 is disposed as clearly shown in FIG. 7A. That is, a distance LD is provided from the pivotal axis P to the caster axis 13a of left front wheel 1 acting as a support point of front wheel support frame 14 for supporting the left front wheel 1. A distance RD is provided from the pivotal axis P to the caster axis 13a of right front wheel 1 acting as a support point of front wheel support frame 14 for supporting the right front wheel 1. The pivotal axis P is located to make distance RD greater than distance LD. That is, the vehicle body 10 may be raised higher when the right front wheel 1 is used as the ground reaction point than when the left front wheel 1 is used as such.

Figure 7:
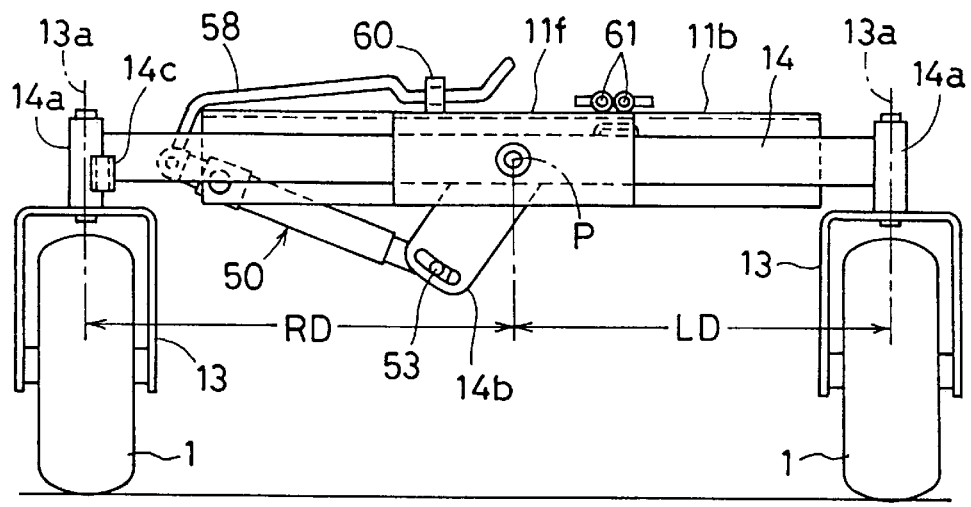
FIGS. 7A and 7B are explanatory views of a running posture and a jack-up posture of a front wheel support frame.
Figure 7:
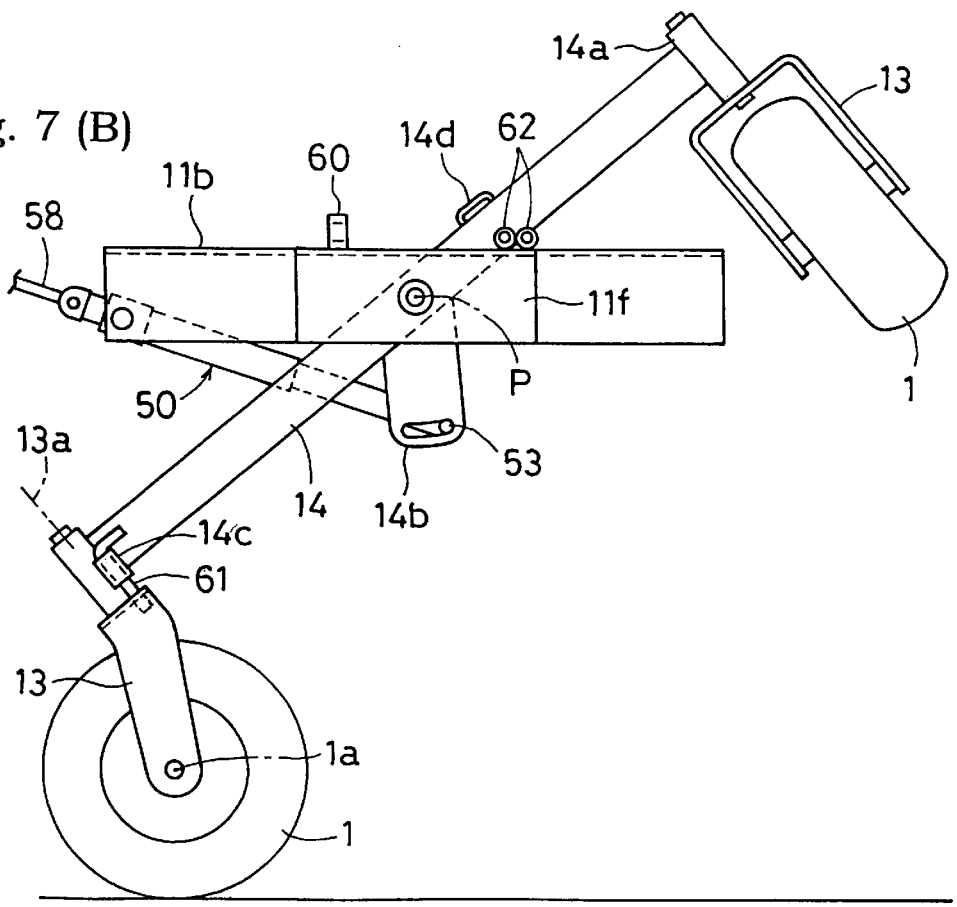
Figure 9:
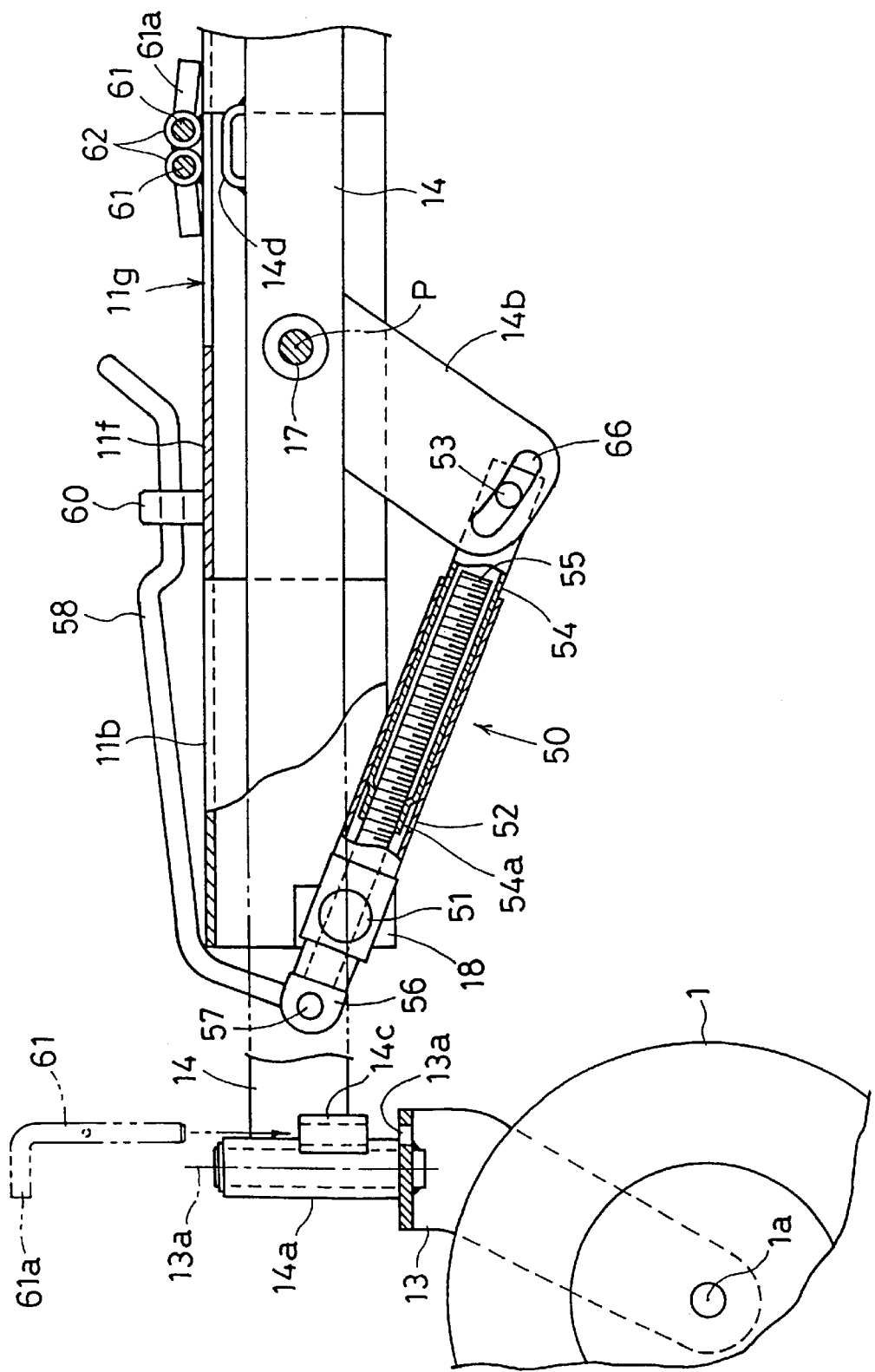
FIG. 9 is a sectional view of a jack device.

As shown in FIGS. 7 and 9, the front wheel support frame 14 has a jack connecting arm 14b extending, to be pivotable together, from a portion where the connecting pin 17 is inserted. The jack connecting arm 14b is formed of a sheet metal (profile) member. A jack device 50 is mounted between the jack connecting arm 14b and a jack support bracket 18 fixed to the rightward end of the front connecting frame 11b. The jack device 50 is the screw type having a jack screw shaft 55 as shown in FIG. 9, though a hydraulic or other jack device may be employed. That is, this jack device 50 includes an outer cylinder 52 having one end thereof pivotally connected to the jack support bracket 18 through a connecting pin 51, an inner cylinder 54 having one end thereof slidably fitted in the outer cylinder 52, and the other end pivotally connected to the jack connecting arm 14b by a connecting pin 53, and the jack screw shaft 55 having a proximal end thereof supported in the outer cylinder 52 only to be rotatable relative thereto, and a distal end extending into the inner cylinder 54 and meshed with a screw 54a formed therein.

The jack screw shaft 55 has a jack control 56 mounted, to be rotatable together, at an end thereof projecting from the outer cylinder 52. A jack handle 58 is connected to the jack control 56 through a connecting pin 57. This jack handle 58 is attached to a handle holder 60 mounted on the upper surface of front connecting frame portion 11b for storage. The handle holder 60 formed of a spring plate curved to wrap around and pinch the jack handle 58. The jack handle 58 may be attached to the handle holder 60 by pushing the shank of jack handle 58 in through an opening of handle holder 60. The jack handle 58 may be removed from the handle holder 60 by drawing the shank of jack handle 58 out through the opening of handle holder 60. The connecting pin 57 connects the forward end of jack handle 58 to the jack control 56 to be rotatable therewith about the axis of jack screw shaft 55, and to be rotatable relative thereto about an axis extending perpendicular to the axis of jack screw shaft 55. The jack handle 58 is movable, with the forward end thereof connected to the jack control 56, between a storage position attached to the front connecting frame portion 11b inwardly of the vehicle body, and a use position taken out of the storage position rightwardly of vehicle body 10 and extending from the jack control 56. The jack control 56 is rotatable by turning the jack handle 58 in the use position.

That is, the jack handle 58 is taken out of the storage position to the use position, and manually turned to rotate the jack control 56. Then, the jack screw shaft 55 is rotated to slide inner cylinder 54 in a direction to project from or retract into the outer cylinder 52, with a point of reaction provided by a portion of the outer cylinder 52 relatively rotatably supporting the jack screw shaft 55. Then, the jack device 50 is extended with the inner cylinder 54 projecting from the outer cylinder 52, or contracted with the inner cylinder 54 retracted into the outer cylinder 52. The jack device 50 causes, through the connecting pin 53, the jack connecting arm 14b to pivot about the axis P. The front wheel support frame 14 is thereby swung to and supported in the running posture or jack-up posture relative to the vehicle body 10.

As shown in FIG. 9, a tube is fixed to the boss 14a of front wheel support frame 14 supporting the right front wheel 1 to provide a pin attaching element 14c for removably receiving a caster lock pin 61. The front wheel support 13 of right front wheel 1 has a pinhole 13a formed in an upper end thereof for removably receiving the caster lock pin 61. When the caster lock pin 61 is placed to extend through the pin attaching element 14c and front wheel support 13, the caster lock pin 61 locks the right front wheel 1 to position the right front wheel 1 against pivotal movement about the caster axis 13a of front wheel support 13. The right front wheel 1 may be set to a direction relative to the front wheel support frame 14 suitable to the jack-up shown in FIG. 7B, and may be caster-locked to this direction. That is, the right front wheel 1 is set to a position having the wheel axis 1a thereof located opposite the pivotal axis P of front wheel support frame 14 across the caster axis 13a and extending longitudinally of the vehicle body. The right front wheel 1 is locked against pivotal movement about the caster axis 13a. When the caster lock pin 61 is removed from the pin attaching element 14c and front wheel support 13, the caster lock pin 61 unlocks the right front wheel 1 to cancel the positioning of the right front wheel 1 against pivotal movement. The right front wheel 1 is now allowed to pivot about the caster axis 13a relative to the front wheel support frame 14.

Figure 8:
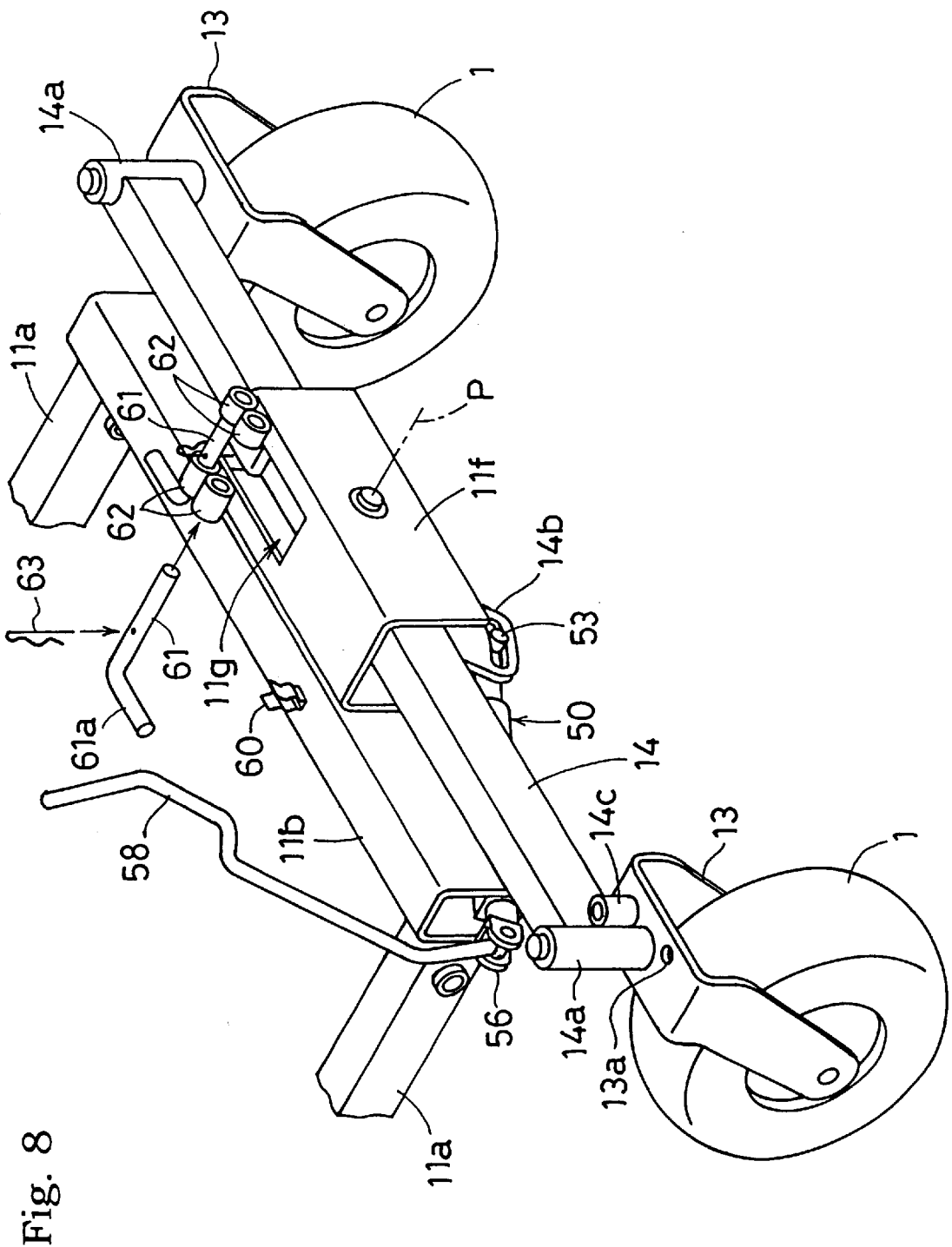
FIG. 8 is a perspective view of a front wheel attachment.

As shown in FIG. 8, the frame support 11f has four pin holders 62 arranged in a left end region on the upper surface thereof. The caster lock pin 61 for the right front wheel 1 and a caster lock pin 61 for the left front wheel 1 may be stored in the pin holders 62 when not used.

Specifically, the frame support 11f defines a cutout 11g for allowing the front wheel support frame 14 to pivot relative to the front connecting frame portion 11b. Each caster lock pin 61 is stored in the two pin holders 62 arranged forwardly and rearwardly of the cutout 11g, by being inserted into the holders 62 over the cutout 11g. A beta pin 63 is inserted through a position of each caster lock pin 61 lying between the two pin holders 62. The caster lock pin 61 is retained in the pin holders 62 by the beta pin 63 contacting one of the pin holders 62 and a handle 61a of the caster lock pin 61 contacting the same pin holder 62. As shown in FIG. 9, the front wheel support frame 14 has a contact element 14d formed of sheet metal and attached to the upper surface thereof. When an attempt is made to pivot the front wheel support frame 14 without removing the caster lock pins 61 from the pin holders 62, the contact element 14d contacts the caster lock pins 61, and the front wheel support frame 14 cannot pivot any further. Thus, the caster lock pins 61 stored act as a stopper for preventing pivotal movement of the front wheel support frame 14.

As shown in FIGS. 4 and 5, the coupling 31b of each of the right and left front pivotal links 31 defines pinholes 31c for removably receiving a link lock pin 64. Each of the right and left frame portions 11a of forward body frame 11 has a bracket 65 fixed thereto and defining a pinhole for removably receiving the link lock pin 64. When the link lock pin 64 is placed to extend through the front pivotal link 31 and bracket 65, the link lock pin 64 locks the front pivotal link 31. The front pivotal link 31 is thereby locked to the forward body frame 11, so that the front pivotal link 31 does not pivot downward from the vehicle body 10 under the weight of mower unit 20 when the vehicle body 10 is jacked up. When the link lock pin 64 is removed from the front pivotal link 31 and bracket 65, the link lock pin 64 unlocks the front pivotal link 31. The front pivotal link 31 becomes pivotable relative to the forward body frame 11 to allow the mower unit 20 to be raised or lowered by an operation of the lift control lever 44.

Figure 6:
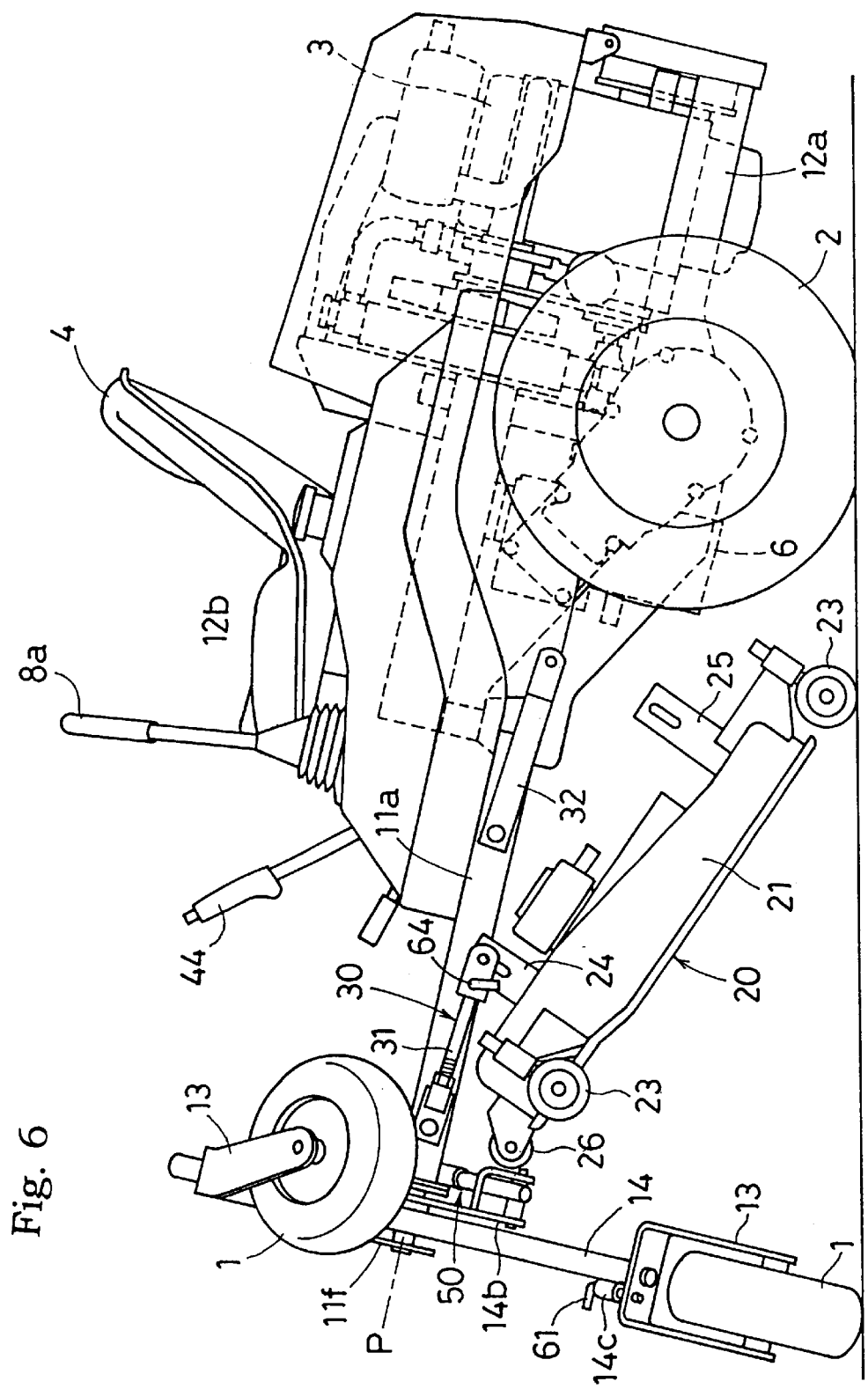
FIG. 6 is an explanatory view of a body jack-up.

That is, an operation requiring accessing the interior of the mower 19 deck 21 of mower unit 20, such as cleaning the interior or changing the rotary cutting blades 22, may be carried out with the mower deck 21 set to the posture shown in FIG. 6.

A forward portion of the floor plate 5 of the driving platform acts as a cover for covering an area over the front wheel support frame 14 and the jack handle 58 and caster lock pins 61 in storage. The floor plate 5 may be removed from the forward body frame 11 to open the area over the front wheel support frame 14, front connecting frame portion 11b and frame support 11f. The two caster lock pins 61 are removed from the frame support 11f to cancel the function of the casterlock pins 61 to prevent pivotal movement of the front wheel support frame 14. One of the caster lock pins 61 is placed to extend through the front wheel support frame 14 and the support 13 of right front wheel 1 to caster-lock the right front wheel 1 to the direction suited to jack-up. Then, the jack handle 58 is taken out of the storage position laterally outwardly of the vehicle body. The jack handle 58 is turned to extend the jack device 50, whereby the front wheel support frame 14 pivots from the running posture to the jack-up posture. Then, the front wheel support frame 14 raises the vehicle body 10 to the jack-up posture with the forward end raised about the axis of rear wheels 2. The mower unit 20 also takes an inclined posture with the forward end thereof raised. The interior of mower deck 21 is exposed forward and upward to allow hands and tools to be inserted easily from front.

At this time, the front pivotal links 31 and rear pivotal links 32 of the connecting mechanisms 30 may remain connected to the mower unit 20, so that the mower unit 20 is raised and locked to the non-operative position relative to the vehicle body 10. It will be advantageous, as shown in FIG. 6, to lock the right and left front pivotal links 31 with the link lock pins 64 and the front pivotal links 31 do not lower from the vehicle body 10 and to disconnect the right and left rear 25 pivotal links 32 from the mower unit 20 before or after the jack-up of vehicle body 10. Then, the interior of mower deck 21 is better exposed forward and upward, with the rear end of mower unit 20 falling to the ground, to facilitate access to the interior still further.

As shown in FIG. 9, the pinhole 66 for attaching the connecting pin 53 to the jack connecting frame 14b is in the form of a slot. That is, the pinhole 66 connects the jack device 50 and front wheel support frame 14, while providing a play-accommodating connection therebetween, so that the front wheel support frame 14 in the running posture may freely roll relative to the vehicle body 10 about the pivotal axis P acting as a rolling axis, within an angular range determined by the length of pinhole 66.

As a result, when the front wheels 1 ride on a ridge or fall into a recess, the front wheel support frame 14 rolls about the axis P relative to the vehicle body 10. The height of right and left front wheels 1 relative to the vehicle body 10 varies to maintain a transverse posture of the vehicle body horizontal or near horizontal. An operation may be carried out with no or little difference in height over the ground between the right and left sides of mower unit 20. That is, regardless of ruggedness of the ground, an operation may be carried out while equalizing cutting heights of the right and left sides of mower unit 20 as much as possible.

Figure 10:
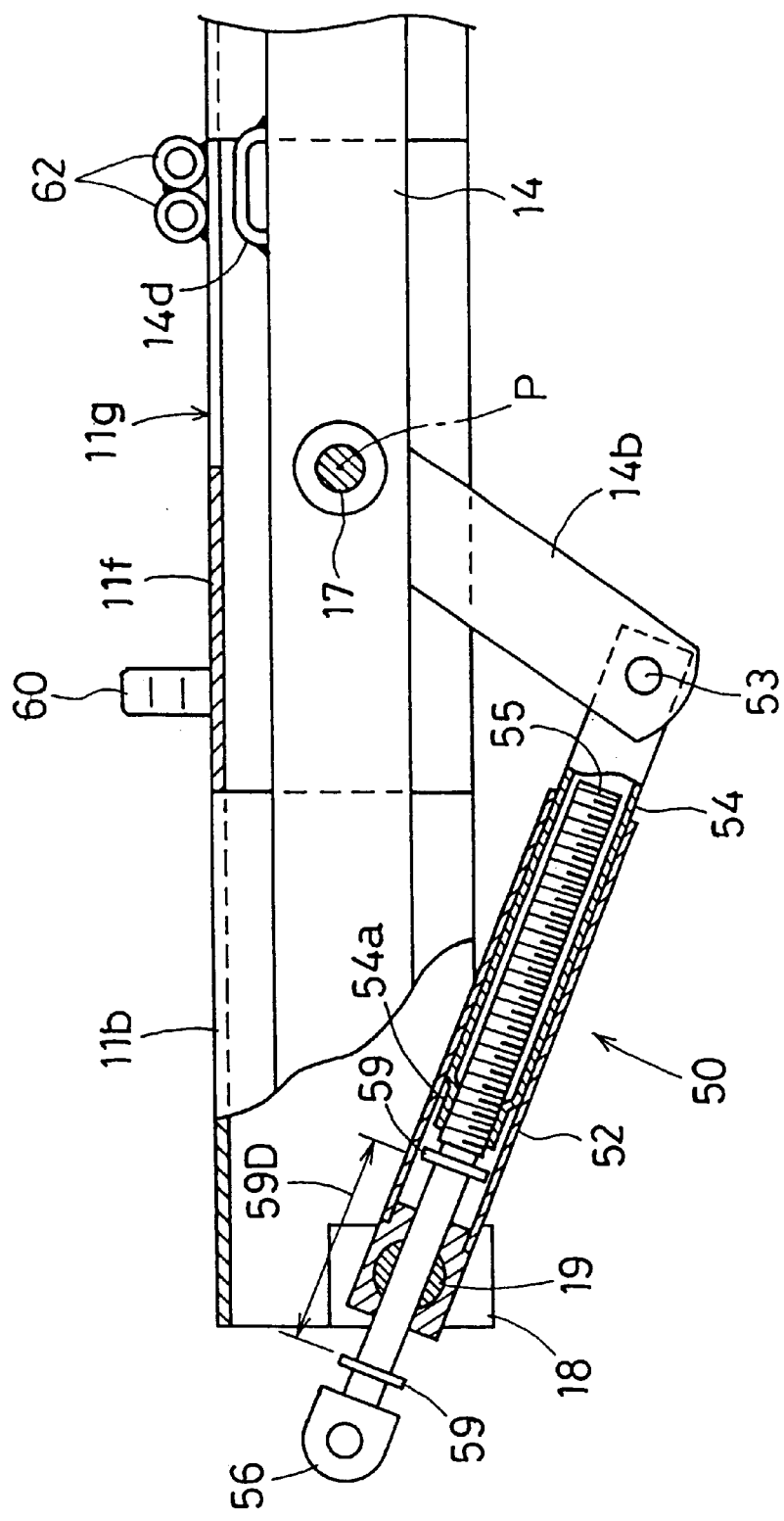
FIG. 10 is a sectional view of a jack connecting structure in a different embodiment.

FIG. 10 shows a jack device mounting structure in a different embodiment. In this mounting structure, the jack screw shaft 55 has one end thereof relatively rotatably and slidably extending through a jack connecting shaft 19 rotatably supported by the jack support bracket 18. The jack screw shaft 55 has screw shaft bearings 59 fixed thereto in positions axially opposed across the jack connecting shaft 19. In this way, the jack device 50 is connected to the front connecting frame 11b of forward body frame 11.

Thus, when the jack device 50 is extended or contracted to pivot the front wheel support frame 14, one of the screw shaft bearings 59 contacts the jack connecting shaft 19. As a result, the jack screw shaft 55 swings the jack connecting arm 14b of front wheel support frame 14, with the jack connecting shaft 19 acting as a reaction point member.

A distance 59D between inward surfaces of the two screw bearings 59 is greater than an outside diameter of jack connecting shaft 19. With the distance 59D between the screw bearings 59, the jack device 50 and vehicle body 10 are connected to each other with a play-accommodating connection therebetween, so that the front wheel support frame 14 in the running posture may freely roll relative to the vehicle body 10 about the pivotal axis P acting as a rolling axis, within an angular range determined by the distance 59D between the screw bearings 59.

The floor plate 5 of the driving platform may be removed from the forward body frame 11 to open the area over the front wheel support frame 14, front connecting frame portion 11b and frame support 11f. Alternatively, the floor plate 5 of the driving platform may be arranged pivotable relative to the vehicle body to open the area over the front wheel support frame 14, front connecting frame portion 11b and frame support 11f, and to be placed in a predetermined use position. In place of each caster lock pin 61, a hook may be attached to one of the front wheel support frame 14 and front wheel support 13 to be pivotable to engage and disengage from the other, thereby caster-locking and unlocking each front wheel 1. Various other constructions may be employed for this purpose. The caster lock pins 61 and hooks are collectively called herein the locking device 61.

In place of each link lock pin 64, a hook may be attached to one of the body frame and front pivotal link 31 to be pivotable to engage and disengage from the other, thereby locking and unlocking the front pivotal link 31. Various other constructions may be employed for this purpose. The link lock pins 64 and hooks are collectively called herein the link locking device 64.

This invention is applicable also to a lawn tractor having idle wheels attached to rearward positions of a vehicle body, and drive wheels attached to forward positions of the vehicle body. In this case, a frame supporting the rear idle wheels is adapted pivotable by the jack device between a running posture and a jack-up posture. Thus, the front wheels 1 are called herein freely rotatable running wheels 1, the rear wheels 2 are called herein drivable rear wheels 2, the front pivotal links 31 are called herein pivotal links 31 adjacent the freely rotatable running wheels, and the rear pivotal links 32 are called herein pivotal links 32 remote from the freely rotatable running wheels.

The invention claimed is:

1. A lawn tractor comprising:

an engine;

a vehicle body mounting said engine thereon and extending fore and aft with respect to a traveling direction;

a first wheel unit having a pair of front wheels provided at a forward end of said vehicle body and right and left with respect to the traveling direction;

a second wheel unit having a plurality of drivable rear wheels, said second wheel unit being provided rearwardly of said first wheel unit;

a mower unit connected to said vehicle body so as to be raised and lowered with respect to said vehicle body between said first and second wheel units, said mower unit driven by said engine mounted on said vehicle body, with retaining connection with said vehicle body;

a support frame connected to said vehicle body at a forward position of said mower unit, said support frame pivotal about a single axis with respect to said vehicle body, said single axis being offset laterally with respect to the traveling direction from an axis passing through said support frame at a midpoint between said front wheels;

wherein said support frame is disposed in a front end region of said vehicle body, wherein said vehicle body and said mower unit are pivotally displaceable together about the single axis to switch over said mower unit from a running posture to a jack-up posture, with said second wheel unit contacting the ground and with said support frame supporting the fore part of said vehicle body;

wherein in said jack-up posture, said vehicle body is lifted up from the ground about a wheel axis of said second wheel unit and a space for servicing said mower unit is defined between the ground and said mower unit connected to said vehicle body; and wherein said engine has its center of gravity located rearwardly of said wheel axis of said second wheel unit.

2. A lawn tractor as defined in claim 1, further comprising a jack device for pivoting said support frame about the single axis, the jack device adapted to pivot said support frame about the single axis to switch over said mower unit from the running posture to the jack-up posture.

3. A lawn tractor comprising:

an engine;

a vehicle body mounting said engine thereon and extending fore and aft with respect to a traveling direction, and further comprising a body frame;

a pair of front wheels supported by a front end of said vehicle body;

a pair of rear wheels supported by a rear end of said vehicle body;

a mower unit mounted to said vehicle body between said front and rear pairs of wheels; and a jack device provided at the front end of said vehicle body and configured to lift the front end of said vehicle body from a running posture wherein said front wheels are in contact with the ground to a jack-up posture wherein the front end is lifted up from the ground providing a space for servicing said mower unit, said jack device connected pivotally at one end to said body frame and connected at a second end to a support frame, which is connected pivotally to said body frame to be pivotal about a pivot axis relative to said body frame and interfaces with the ground to place the front end of said vehicle body in the jack-up posture, wherein said pivot axis is offset laterally with respect to the traveling direction from an axis passing through said support frame at a midpoint between said front wheels.

4. A lawn tractor as defined in claim 3, wherein said support frame supports said front wheels, and wherein said jack device is adapted to pivot said support frame about the pivot axis to place the front end of said vehicle body in the jack-up posture.

5. A lawn tractor as defined in claim 4, wherein one of said front wheels is a ground engaging point when said support frame is pivoted by said jack device to place the front end of said vehicle body in the jack-up posture.

6. A lawn tractor as defined in claim 4, wherein said front wheels each comprise a wheel support connecting said front wheels to said support frame, and wherein one of said front wheels is configured to be locked to prevent pivotal movement by a pin cooperating with a pin attaching element connected to said support frame and an opening in one of said wheel supports, such that said one of said front wheels operates as a ground engaging point when said support frame is pivoted by said jack device to place the front end of said vehicle body in the jack-up posture.

7. A lawn tractor as defined in claim 4, further comprising a frame support fixed to said body frame and defining a cutout allowing said support frame to pivot about the pivot axis, said frame support comprising pin holders on opposite sides of said cutout for receiving a pin for preventing pivotal movement of said support frame through said cutout.

8. A lawn tractor as defined in claim 3, wherein said jack device comprises a jack screw or hydraulic jack device.

9. A lawn tractor as defined in claim 3, wherein the second end of said jack device comprises a connecting pin received in a slotted jack arm connected to said support frame.

10. A lawn tractor comprising:

an engine;

a vehicle body mounting said engine thereon and extending fore and aft with respect to a traveling direction of the lawn tractor, and further comprising a body frame;

a support frame connected pivotally to said body frame, said support frame supporting a pair of front wheels;

a pair of rear wheels supported by a rear end of said vehicle body;

a mower unit mounted to said vehicle body between said front and rear pairs of wheels; and a jack device connected between said body frame and said support frame and configured to pivot said support frame relative to said body frame to lift the front end of said vehicle body from a running posture wherein said front wheels are in contact with the ground to a jack-up posture wherein the front end is lifted up from the ground providing a space for servicing said mower unit, said jack device connected pivotally at one end to said body frame and connected at a second end to a support frame, wherein a pivot axis of said support frame is offset laterally with respect to the traveling direction from an axis passing through said support frame at a midpoint between said front wheels.

11. A lawn tractor as defined in claim 10, wherein said front wheels each comprise a wheel support connecting said front wheels to said support frame, and wherein one of said front wheels is configured to be locked to prevent pivotal movement by a pin cooperating with a pin attaching element connected to said support frame and an opening in one of said wheel supports, such that said one of said front wheels operates as a ground engaging point when said support frame is pivoted by said jack device to place the front end of said vehicle body in the jack-up posture.

12. A lawn tractor as defined in claim 10, further comprising a frame support fixed to said body frame and defining a cutout allowing said support frame to pivot relative to said body frame, said frame support comprising pin holders on opposite sides of said cutout for receiving a pin for preventing pivotal movement of said support frame through said cutout.

13. A lawn tractor as defined in claim 10, wherein said jack device comprises a jack screw or hydraulic jack device.

14. A lawn tractor as defined in claim 10, wherein the second end of said jack device comprises a connecting pin received in a slotted jack arm connected to said support frame.

* * * * *